C. E. COX.
LIQUID LEVEL GAGE.
APPLICATION FILED JAN. 26, 1920.
1,378,327.
Patented May 17, 1921.
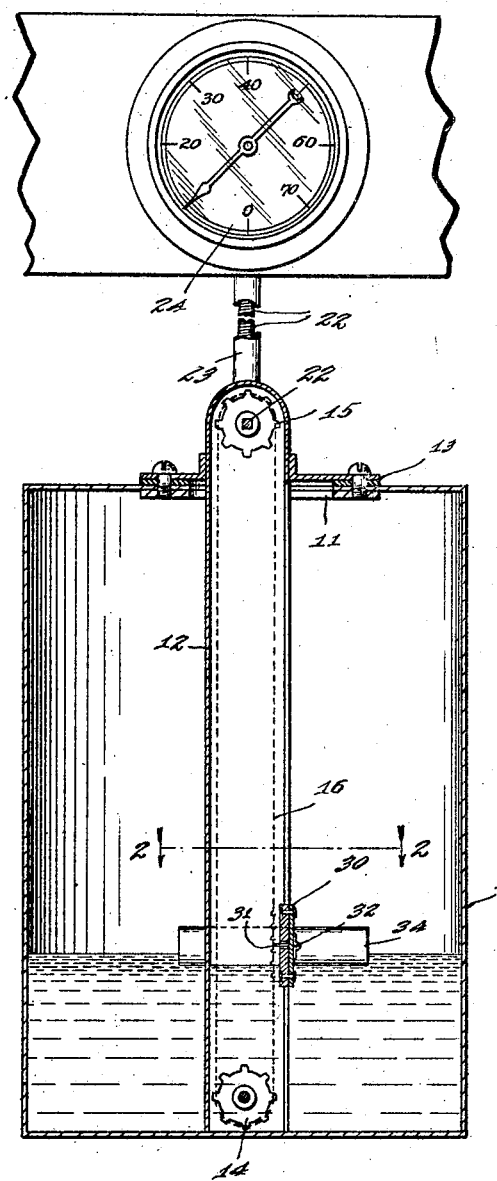
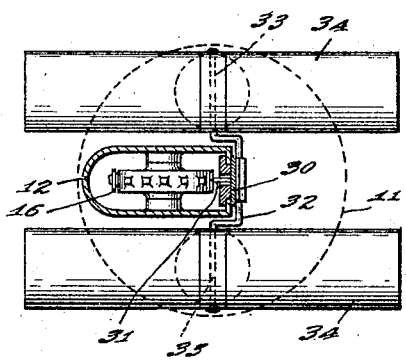
Inventor
Claude E. Cox,
By Hood & Schley
Attorneys

UNITED STATES PATENT OFFICE.

CLAUDE E. COX, OF CHICAGO, ILLINOIS.

LIQUID-LEVEL GAGE.

1,378,327.     Specification of Letters Patent.     Patented May 17, 1921.

Application filed January 26, 1920. Serial No. 354,024.

*To all whom it may concern:*

Be it known that I, CLAUDE E. Cox, a citizen of the United States, residing at Chicago, in the county of Cook and State of Illinois, have invented a new and useful Liquid-Level Gage, of which the following is a specification.

In motor vehicles, dependent upon liquid fuel, especially air-ships and automobiles, it is important that the driver know the available fuel supply at all times and in most instances, it is desirable that the fuel reservoir be considerably removed from the driver.

The object of my present invention is, therefore, to produce a gage for fuel levels, of such character that varying levels may be indicated at a distant point with a minimum error.

The accompanying drawings illustrate my invention. Figure 1 is a vertical section of an embodiment of my invention and Fig. 2 a section on line 2—2 of Fig. 1.

In the drawings, 10 indicates a reservoir of any desired capacity having an opening 11, a housing 12, having a length substantially equal to the depth of the reservoir (if full depths are to be indicated) is provided with a flange 13, by means of which it may be secured in place as shown. The housing 12 supports an idler sprocket 14 at its lower end and a driving sprocket 15 at its upper end, this upper sprocket being carried by a shaft 22 which is conveniently, as to its portions beyond the housing, a flexible shaft mounted in a closely confining tube 23 which extends from the housing 12 to the housing of an indicating instrument 24.

The housing 12 is given a cross section closely approximating the cross sectional dimensions of the space occupied by the chain 16 and at one side is provided with separated flanges between which is mounted a cross head 30, provided with a pin 31 adapted to engage the adjacent portion of the chain 16. Clamped upon the cross head 30 is a rod 32, the ends of which are formed into alined fingers 33 which are brought substantially into the plane of that portion of chain 16 engaged by pin 31, and pivoted upon each arm is a float 34 which has a length considerably greater than its cross section, the cross sections of the two floats being such that they lie within the area defined by the opening 11 which gives access to the interior of the reservoir 10, as indicated in dotted lines in Fig. 2.

It will become apparent that by this arrangement, I am able to provide elements having sufficient weight and buoyancy to drive chain 16 and the parts driven by it and yet of such character that, when the floats are turned at right angles to their normal flotation position, as indicated in dotted lines in Fig. 2, they may be introduced into the reservoir 10 through the comparatively small opening 11, the parts being generally and preferably so designed as to be insertible through the opening which is ordinarily found in commercial reservoirs.

I claim as my invention:

1. In a liquid gage, a housing projectable into a reservoir through an opening therein, float controlled means including a chain mounted in said housing, and a floatable member having dimensions less than the corresponding dimensions of the opening and having normal flotation dimensions one of which is greater than the maximum dimension of the said opening, said flotation member being pivotally connected to said chain, for the purpose set forth.

2. In a liquid gage, a housing projectable into a reservoir through an opening therein, a float controlled means including a chain mounted in said housing, a pair of floatable members each having flotation-dimensions one of which is greater than the maximum dimension of said opening, said pair of flotation members being balanced relative to the chain plane and pivotally connected with said chain, so that they may be shifted to present combined dimensions less than the corresponding dimensions of the said opening.

In witness whereof, I have hereunto set my hand at Chicago, Illinois, November, A. D. one thousand nine hundred and nineteen.

CLAUDE E. COX.